United States Patent
Kim et al.

(10) Patent No.: US 10,341,911 B2
(45) Date of Patent: Jul. 2, 2019

(54) METHOD FOR ESTABLISHING PLURALITY OF PDN CONNECTIONS BY MEANS OF CSIPTO

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 15/308,707

(22) PCT Filed: May 4, 2015

(86) PCT No.: PCT/KR2015/004485
§ 371 (c)(1),
(2) Date: Nov. 3, 2016

(87) PCT Pub. No.: WO2015/170862
PCT Pub. Date: Nov. 12, 2015

(65) Prior Publication Data
US 2017/0188275 A1 Jun. 29, 2017

Related U.S. Application Data

(60) Provisional application No. 61/988,868, filed on May 5, 2014, provisional application No. 61/989,462, filed
(Continued)

(51) Int. Cl.
| | |
|---|---|
| *H04W 36/02* | (2009.01) |
| *H04W 76/10* | (2018.01) |
| *H04W 76/30* | (2018.01) |
| *H04W 36/00* | (2009.01) |
| *H04W 76/15* | (2018.01) |
| *H04W 8/08* | (2009.01) |
| *H04W 36/12* | (2009.01) |
| *H04W 28/08* | (2009.01) |

(52) U.S. Cl.
CPC ......... *H04W 36/023* (2013.01); *H04W 8/082* (2013.01); *H04W 36/00* (2013.01);
(Continued)

(58) Field of Classification Search
CPC combination set(s) only.
See application file for complete search history.

(56) References Cited

U.S. PATENT DOCUMENTS 9,788,201 B2 * 10/2017 Stojanovski ...... H04W 52/0251
2014/0321328 A1 * 10/2014 Zuniga .................... H04W 8/06
370/254

(Continued)

OTHER PUBLICATIONS

"Study on co-ordinated PGW Change for Selected IP Traffic Offload (CSIPTO)", (Release 13), 3GPP TR 22.828 V1.0.0, Feb. 27, 2014, Technical Specification Group Services and System Aspects.
(Continued)

*Primary Examiner* — Hicham B Foud
(74) *Attorney, Agent, or Firm* — Dentons US LLP

(57) ABSTRACT

The present invention establishes a plurality of packet data network (PDN) connections in a user apparatus by coordinated selected IP traffic offload (CSIPTO). The present invention achieves this by receiving, from a network entity responsible for a control plane, an indication for a gateway rearrangement arising from CSIPTO. A determination is then made as to whether to maintain a previously established first PDN connection on the basis of the indication and establishing a second PDN connection on the basis of the indication. Then, if the previously established first PDN connection is to be maintained, marking one or both of the first PDN connection and the second PDN connection.

12 Claims, 11 Drawing Sheets

Related U.S. Application Data on May 6, 2014, provisional application No. 61/990,663, filed on May 8, 2014.

(52) U.S. Cl.
CPC ......... *H04W 36/125* (2018.08); *H04W 76/10* (2018.02); *H04W 76/15* (2018.02); *H04W 76/30* (2018.02); *H04W 28/08* (2013.01)

(56) References Cited

U.S. PATENT DOCUMENTS

| | | | | |
|---|---|---|---|---|
| 2016/0183149 A1* | 6/2016 | Stojanovski | ...... | H04W 52/0251 |
| | | | | 370/230 |
| 2016/0286451 A1* | 9/2016 | Ahmad | ................ | H04W 76/10 |
| 2018/0270741 A1* | 9/2018 | Enomoto | .............. | H04W 48/00 |

OTHER PUBLICATIONS

Samsung Electronics et al., "Revision of Potential Requirements in CSIPTO for On-Demand Dual PDN Connection Use Case", S1-140029, 3GPP TSG-SA WG1 Meeting #65, San Francisco, USA, Jan. 20-Jan. 24, 2014.

Intel, "CSIPTO TR: Proposed Text for Introduction", S1-135026, 3GPP TSG-SA WG1 Meeting #64, San Francisco, USA, Nov. 11-Nov. 15, 2013.

Intel et al., "Proposed WID for Co-ordinated P-GW change for SIPTO (CSIPTO)", S1-141143, 3GPP TSG-SA WG1 Meeting #66, Sapporo, Japan, May 12-May 16, 2016.

Samsung Electronics et al., "CSIPTO On-Demand Dual PDN Connection", S1-135054, 3GPP TSG-SA WG1 Meeting #64, San Francisco, USA, Nov. 11-Nov. 15, 2013.

* cited by examiner (BPP2014-0236)

METHOD FOR ESTABLISHING PLURALITY OF PDN CONNECTIONS BY MEANS OF CSIPTO

CROSS-REFERENCE TO RELATED APPLICATIONS

This application is a National Stage Application of International Application No. PCT/KR2015/004485, filed on May 4, 2015, which claims the benefit of U.S. Provisional Application No. 61/988,868, filed on May 5, 2014, U.S. Provisional Application No. 61/989,462, filed on May 6, 2014 and U.S. Provisional Application No. 61/990,663, filed on May 8, 2014, all of which are hereby incorporated by reference in their entirety for all purposes as if fully set forth herein.

BACKGROUND OF THE INVENTION

Field of the Invention

The present invention relates to a mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point |

TABLE 1-continued

| REFERENCE POINT | DESCRIPTION |
| --- | --- |
| | can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In the $3^{rd}$ or $4^{th}$ mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a cell having a small radius, such as a pico cell is adopted, a band higher than a frequency used in the existing cellular system may be used, and as a result, it is possible to transfer more information. However, since more base stations should be installed in the same area, higher cost is required.

In recent years, a Femto base station such as a Home (e)NodeB 30 has been proposed while making the approach to increase the cell capacity by using the small cell.

The Home (e)Node 30 has been researched based on a RAN WG3 of the 3GPP Home (e)NodeB and in recent years, the Home (e)NodeB 30 has been in earnest researched even in an SA WG.

FIG. 6 is a diagram illustrating the relationship between (e)NodeB and Home (e)NodeB.

The (e)NodeB 20 illustrated in FIG. 6 corresponds to a macro base station and the Home (e)NodeB 30 illustrated in FIG. 6 may correspond to the Femto base station. In the specification, (e)NodeB intends to be described based on terms of the 3GPP and (e)NodeB is used when NodeB and eNodeB are mentioned together. Further, Home (e)NodeB is used when Home NodeB and Home eNodeB are mentioned together.

Interfaces marked with dotted lines are used to transmit control signals among the (e)NodeB 20, the Home (e)NodeB 30, and an MME 51. In addition, interfaced marked with solid lines are used to transmit data of the user plane.

FIG. 7a illustrates a PDN connection and traffic transmission and reception according to a conventional art, and FIG. 7b illustrates a problem of the conventional art.

As illustrated in FIG. 7a, when a PDN connection of a UE is generated through S-GW #1 and P-GW #1, traffic is transmitted and received via S-GW #1 and P-GW #1. As illustrated in FIG. 7b, when the UE moved, S-GW #2 is selected for the PDN connection. That is, since the serving area of an S-GW (for example, the service area of an S-GW) is predetermined, an S-GW capable of serving a UE is selected based on the topology of a network. However, since a P-GW is selected based on APN information, not on the location of a UE, the P-GW is not reselected even though the UE moves from the location illustrated in FIG. 7a to the location illustrated in FIG. 7b. Accordingly, although the UE is located relatively closer to P-GW #2 than to P-GW #1, the traffic of the UE is transmitted and received through S-GW #2 and P-GW #1, which causes inefficiency in traffic transmission path and network management.

SUMMARY OF THE INVENTION

Accordingly, an object of the present invention is to present a method that can solve the aforementioned problem.

To achieve the foregoing object, one embodiment of the present specification provides a method for establishing a plurality of Packet Data Network (MN) connections due to Co-ordinated Selected IP Traffic Offload (CSIPTO). The method may be performed by a user equipment (UE) may include receiving, from a network entity responsible for a control plane, an indication of reallocation of a gateway due to the CSIPTO; determining whether to maintain a previously established first PDN connection based on the indication; establishing a new second PDN connection based on the indication; and marking one or more of the first PDN connection and the second PDN connection when the previously established first PDN connection is maintained.

The marking may include: marking the first PDN connection as a sub-optimal PDN connection; and marking the second PDN connection as an optimal PDN connection.

The method may further include: determining which one among the first PDN connection and the second PDN connection data of a service is to be transmitted to, according to a type of the service being performed.

The method may further include: transmitting a message requesting deactivation/release of the first PDN connection to the network entity when it is determined that the previously established first PDN connection is not maintained; or not transmitting the message requesting the deactivation/release of the first PDN connection to the network entity when it is determined to maintain the previously established first. PDN connection.

When the message requesting the deactivation/release of the first PDN connection is not transmitted, the network entity may mark the first PDN connection as a sub-optimal PDN connection.

The indication may be received during or after a handover process.

The network entity may be a Mobility Management Entity (MME), and the gateway may be a PDN gateway (P-GW).

To achieve the foregoing object, one embodiment of the present specification provides a user equipment (UE) for establishing a plurality of Packet Data Network (PDN) connections due to Co-ordinated Selected IP Traffic Offload (CSIPTO). The UE may include: a transceiver to receive, from a network entity responsible for a control plane, an indication of reallocation of a gateway due to the CSIPTO; and a processor to determine whether to maintain a previously established first PDN connection based on the indication and to establish a new second PDN connection based on the indication. When the previously established first PDN connection is maintained, the processor may mark one or more of the first PDN connection and the second PDN connection.

According to the embodiments of the present invention, the problems in the related art can be solved.

BRIEF DESCRIPTION OF THE DRAWINGS

FIG. 8 illustrates the concept of Selected IP Traffic Offload (SIPTO) in the scenario of FIG. 7a.

DESCRIPTION OF EXEMPLARY EMBODIMENTS

Figure 1:
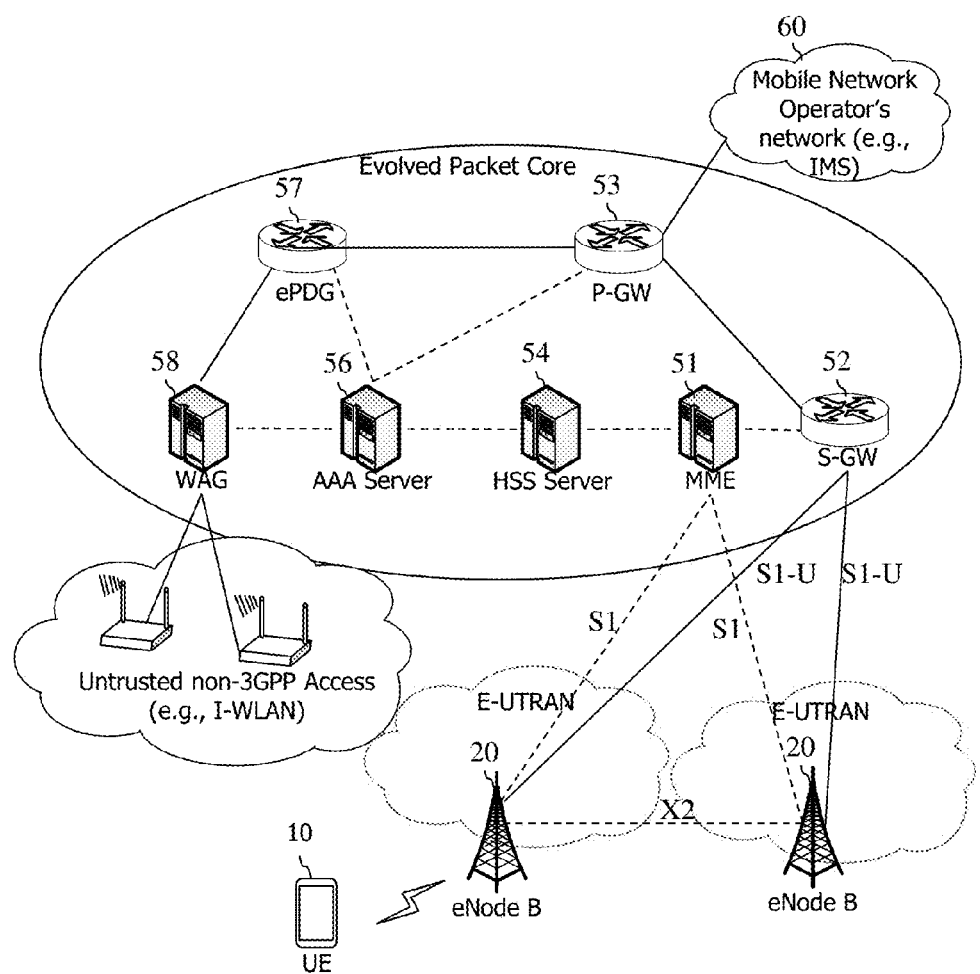
FIG. 1 is a structural diagram of an evolved mobile communication network.
Figure 2:
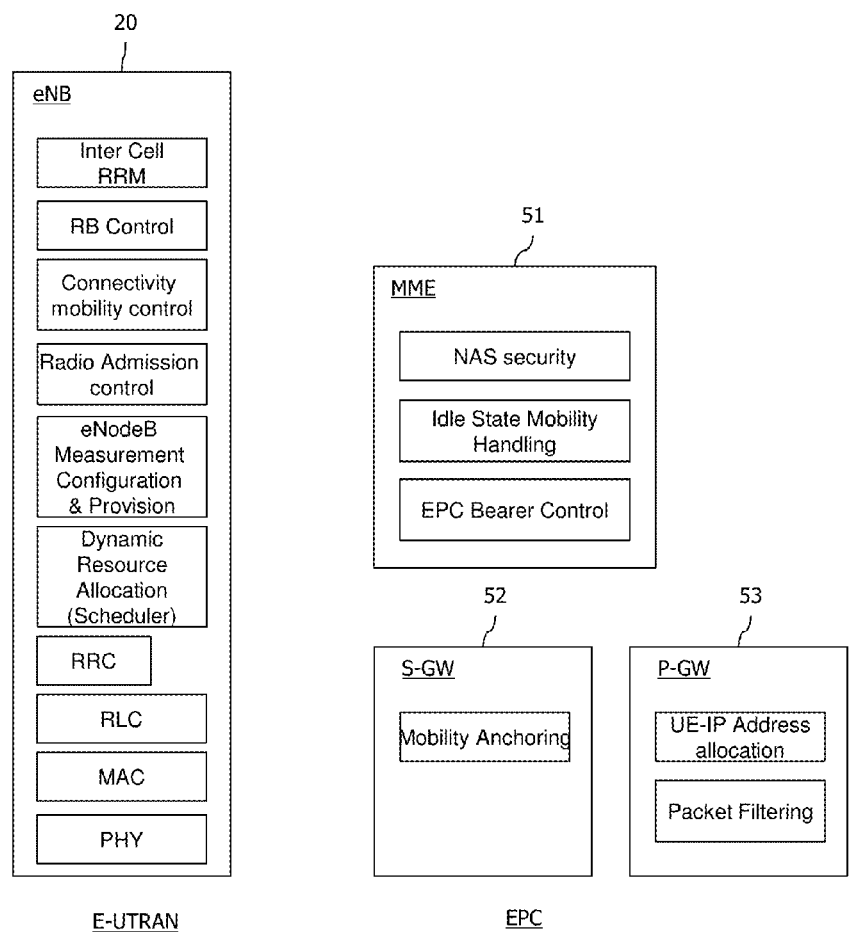
FIG. 2 is an exemplary diagram illustrating architectures of a general E-UTRAN and a general EPC.
Figure 3:
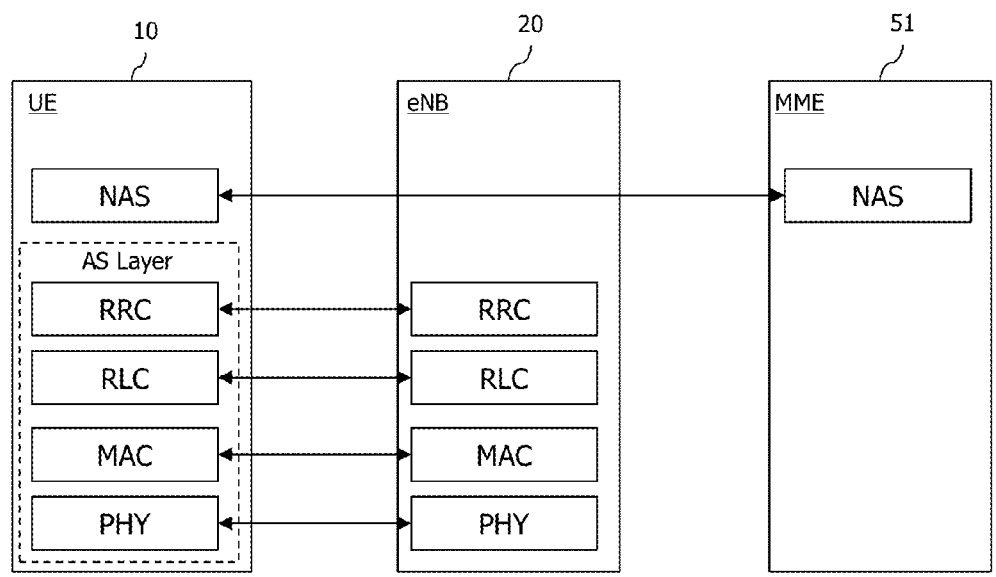
FIG. 3 is an exemplary diagram illustrating a structure of a radio interface protocol on a control plane between UE and eNodeB.
Figure 4:
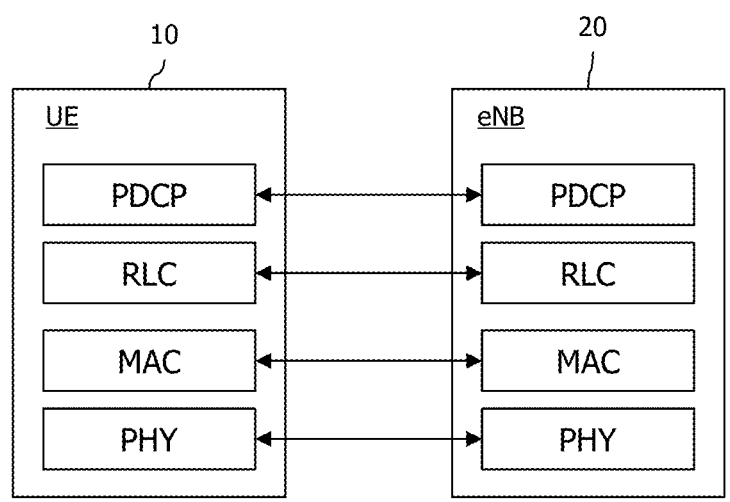
FIG. 4 is another exemplary diagram illustrating a structure of a radio interface protocol on a user plane between the UE and a base station.
Figure 5A:
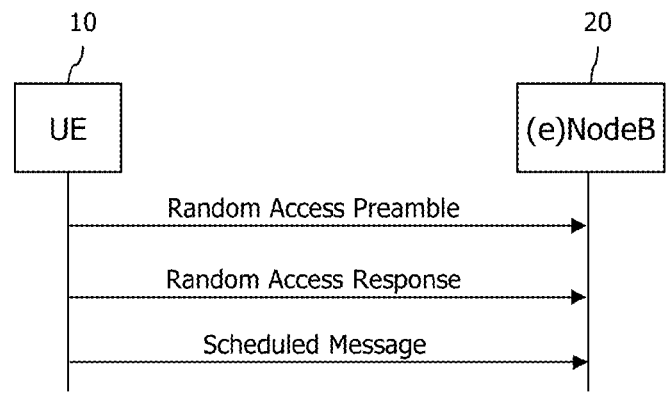
FIG. 5a is a flowchart illustrating a random access process in 3GPP LTE.
Figure 5B:
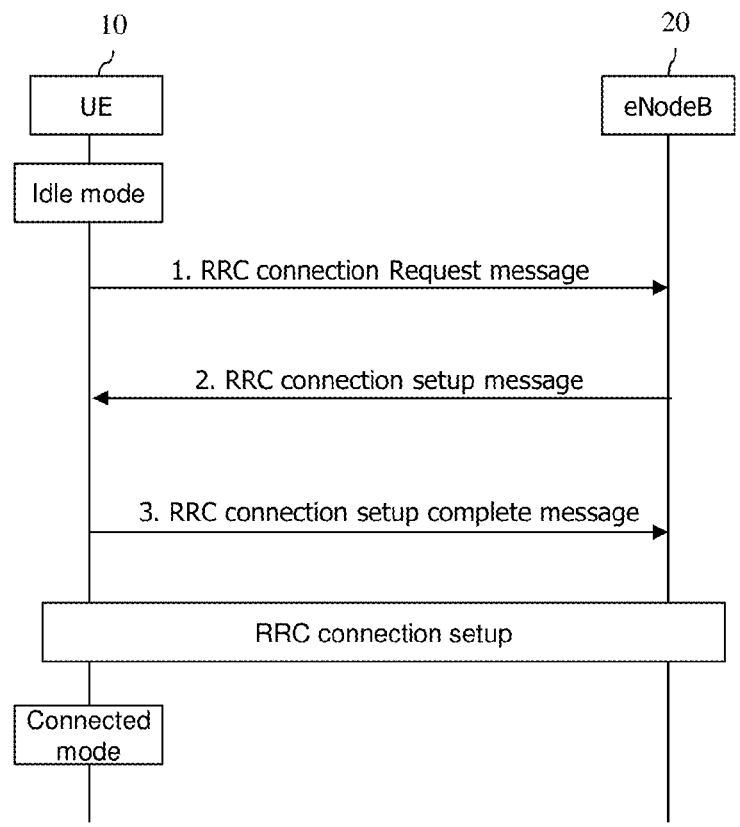
FIG. 5b illustrates a connection process in a radio resource control (RRC) layer.
Figure 6:
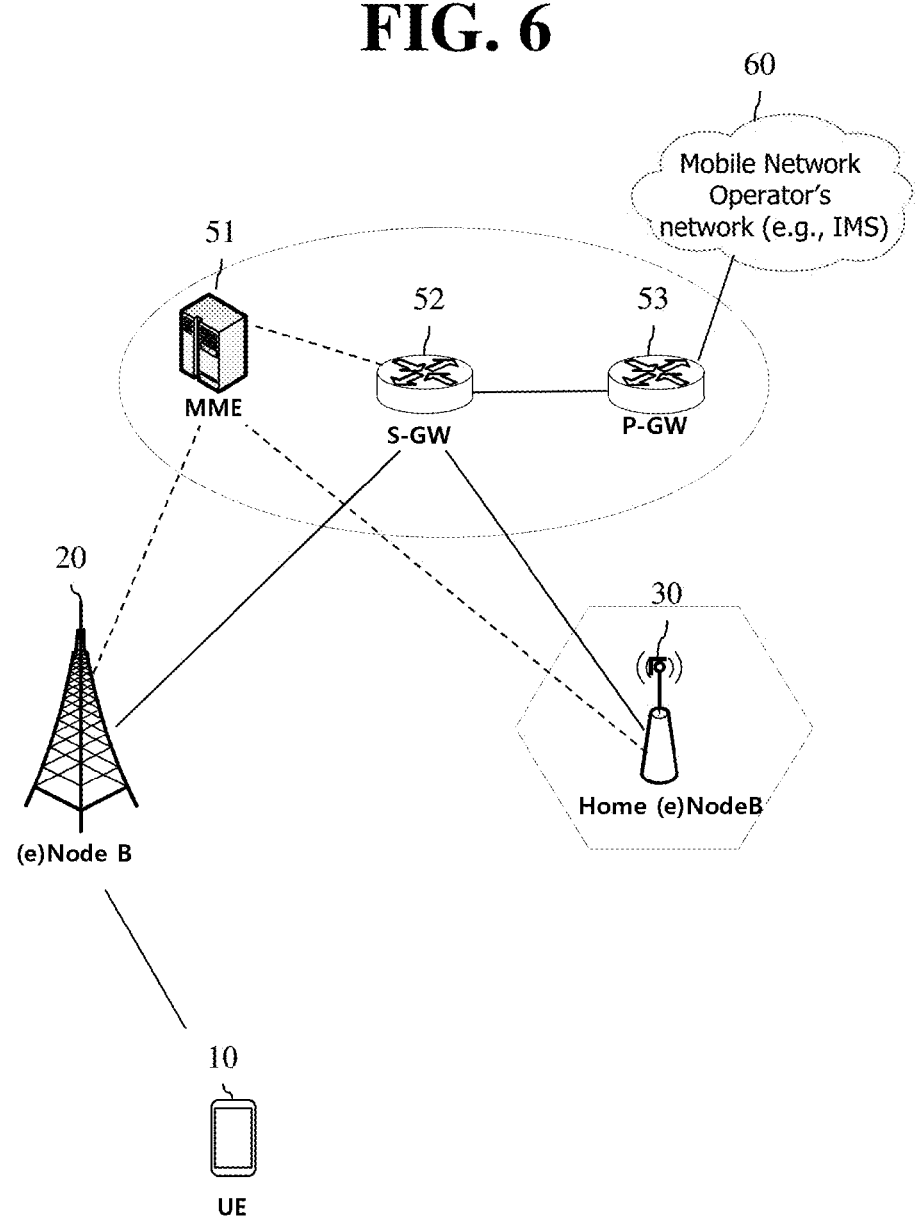
FIG. 6 is a diagram illustrating the relationship between (e)NodeB and Home (e)NodeB.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Local Operating Environment Information: This is a set of implementation specific parameters which describe the local environment in which the UE is operating.

Presence Reporting Area: This is an area defined to report the presence of a UE in a 3GPP packet domain for the reasons of policy control and/or accounting or the like. In case of E-UTRAN, the presence reporting area consists of adjacent or not-adjacent tracking areas or a set of eNodeBs and/or cells. There are two types of presence reporting areas. One is a UE-dedicated presence reporting area, and the other is a presence reporting area predetermined by a core network.

ANDSF (Access Network Discovery and Selection Function): This is one of network entities for providing a policy for discovering and selecting an access that can be used by a UE on an operator basis.

ISRP (Inter-System Routing Policy): This is a rule defined by the operator to indicate which one will be used by the UE for routing of IP traffic among several radio access interfaces. The ISRP may include three types of rules as follows, as a policy for defining an access network preferred (i.e., having a high priority) or restricted to route/steer a packet service (or an IP flow or IP traffic or applications). That is, the ISRP may be divided into an IP flow mobility (IFOM) rule, a multi access PDN connectivity (MAPCON) rule, and a non-seamless WLAN offload (NSWO) rule as follows.

IFOM (IP Flow Mobility) rule: This rule is in regards to
 a list in which access technologies/access networks to be used by the UE are arranged according to a priority, when traffic matched to a specific IP traffic filter can be routed on a specific APN or on any APN. Further, this rule may designate for which radio access the traffic matched to the specific IP traffic filter is limited on the specific APN or on the any APN.

MAPCON (Multi Access PDN Connectivity) rule: This rule is a list in which the access technologies/access networks to be used by the UE are arranged according to the priority when a PDN connection for the specific APN can be routed. Further, this rule may designate for which radio access a PDN connection to a specific APN will be limited.

NSWO(Non-seamless WLAN offload) rule: This rule designates whether certain traffic will be offloaded or not offloaded non-seamlessly to a WLAN.

ISMP (Inter-System Mobility Policy): This is a set of rules defined by an operator to have an impact on an inter-system mobility decision made by the UE. When the UE can route IP traffic on a single radio access interface, the UE may use ISMP to select the most appropriate access technology type or access network in a given time.

RAN rule: This is to evaluate an RAN rule programmed in the UE and having radio access network (RAN) assistance parameters received from the network. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. In this case, the UE selects the WLAN and moves all offloadable PDN connections to the WLAN. Alternatively, when the RAN rule for moving the traffic to the 3GPP access is satisfied, the AS layer of the UE delivers a move-traffic-from-WLAN indication to the higher layer of the UE. In this case, the UE moves all PDN connections on the WLAN through 3GPP. 3GPP TS 23.401, TS 23.060, TS 23.402, TS 36.300, TS 36.304, TS 36.331, TS 25.304, and TS 25.331 may be incorporated herein by reference to know detailed descriptions on the RAN rule.

Multi-access PDN connection: This is a PDN connection in which traffic can be routed to the 3GPP access and/or the WLAN access. Each IP flow is routed only to one access at one instance.

Meanwhile, the present invention is described hereinafter with reference to the accompanying drawings.

Figure 7A:
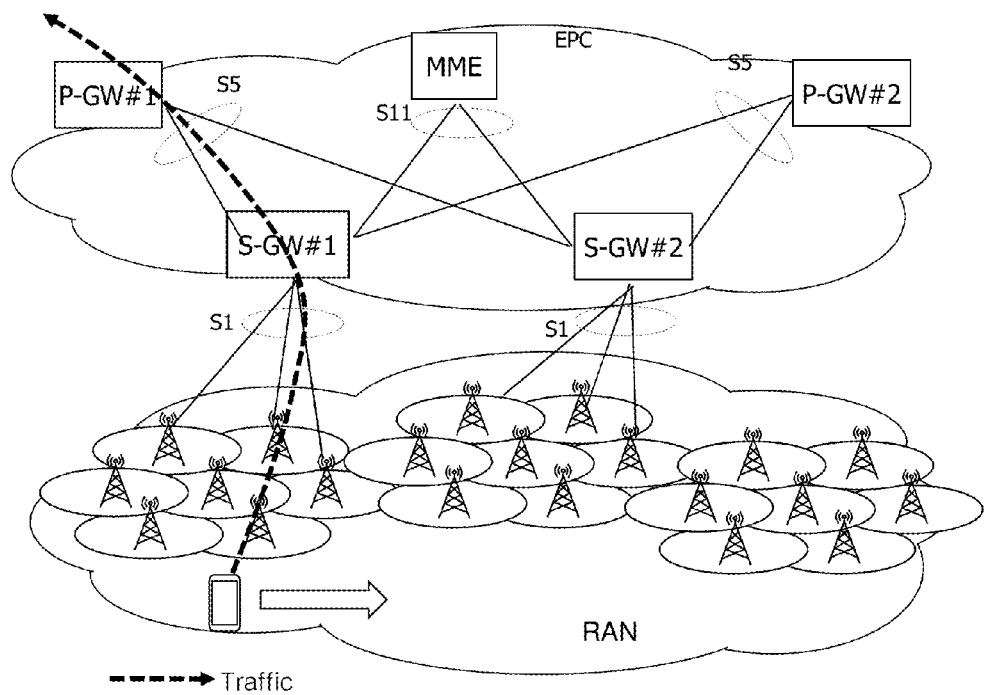
FIG. 7a illustrates a PDN connection and traffic transmission and reception according to a conventional art.
Figure 7B:
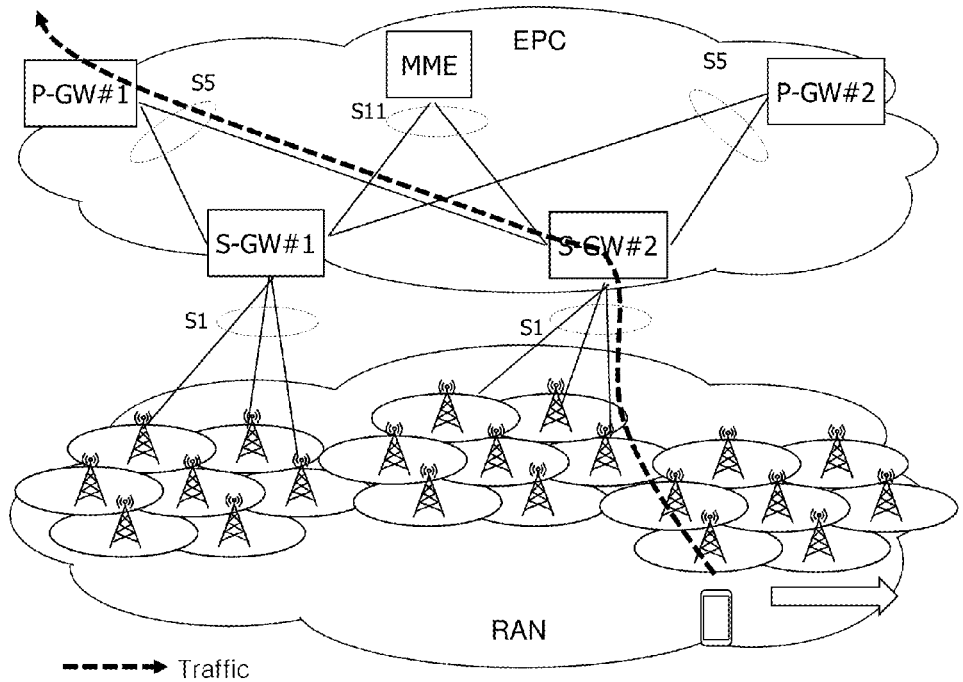
FIG. 7b illustrates a problem of the conventional art in a scenario shown in FIG. 7b.
Figure 8:
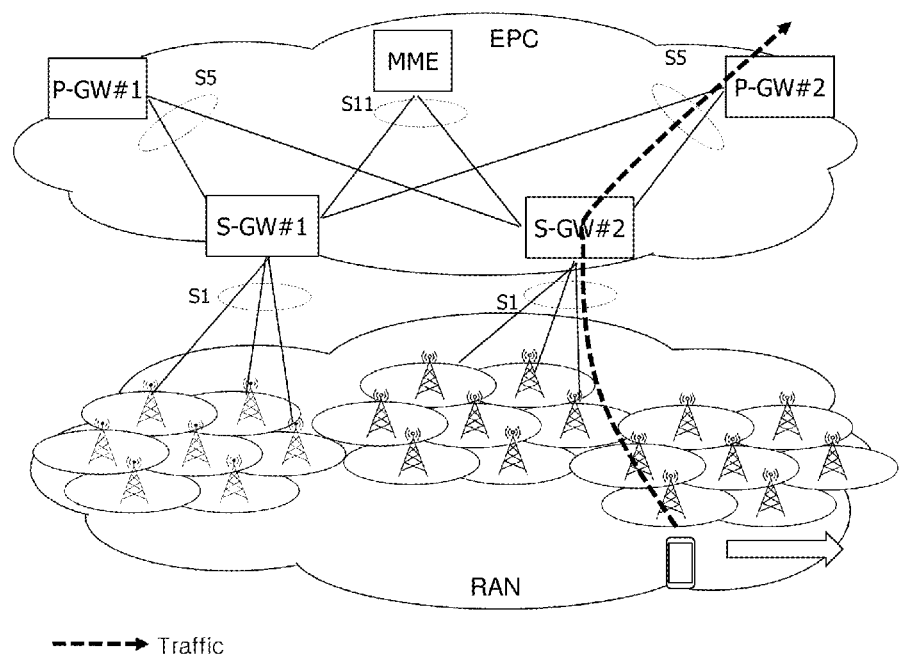

FIG. 8 illustrates the concept of Selected IP Traffic Offload (SIPTO) in the scenario of FIG. 7a.

Figure 11:
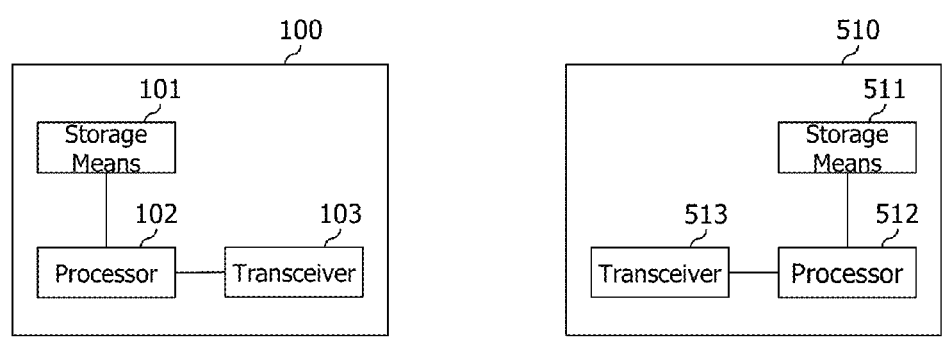
FIG. 11 is a block diagram illustrating a configuration of a UE 100 and an MME 510 according to one embodiment of the present invention.

As described above, despite UE movements, a P-GW selected in a PDN connection initially established is used, causing a problem of inefficiency in traffic transmission path and network management To solve such a problem, various methods have been proposed to optimize a P-GW. For example, as illustrated in FIG. 8, when a UE is moving and a more optimal P-GW, that is, P-GW #2, appears, P-GW #2 is selected to establish a PDN connection to P-GW #2 instead of P-GW #1. That is, SIPTO has been proposed in which P-GW reselection or relocation is performed to route selected traffic (for example, Internet traffic) to a network node close to the UE's location (UE's point of attachment to the access network). Thus, traffic is transmitted through S-GW #1 and P-GW #1 in FIG. 7a. In FIG. 11, however, as the UE is moving, S-GW #2 capable of serving the UE's location is selected and P-GW #2 close to the UE's location is also selected, and accordingly traffic is transmitted and received through S-GW #2 and P-GW #2.

The foregoing SIPTPO technology has evolved according to 3GPP releases.

SIPTO is first standardized in 3GPP release 10, in which a seamless detour is not supported and thus a user faces temporary service disruption. A specific description is made as follows. First, when a UE moves to a different base station (BS), a target MME may reselect or relocate a more suitable P-GW for the current location of the UE (for example, a P-GW geographically or topologically closer to the location of the UE) according to a result of UE movement and may determine to redirect a PDN connection of the UE to the reselected (or relocated) P-GW. When the MME determines to reselect (or relocate) a P-GW, the MME performs a PDN disconnection procedure indicating "reactivation requested" to the UE with respect to a PDN connection to redirect. When the MME determines to relocate all PDN connections for the UE, the MME performs a detach procedure indicating "explicit detach with reattach required" to the UE.

However, when the UE has a running application during P-GW reselection (or relocation, that is, when the UE has traffic to transmit/receive via the original P-GW), a service may be temporarily suspended due to an IP address change of the UE by P-GW reselection (or relocation).

To prevent service disruption, 3GPP release 11 allows the MME to release a PDN connection in order to perform P-GW reselection (or relocation) by SIPTO only i) when the UE is in the idle mode or ii) while the UE is performing a TAU procedure in which no user-plane bearer is generated. Accordingly, when the UE is in the connected mode, even though another P-GW is more suitable for the current location of the UE location according to the mobility of UE, the MME does not perform reselection of (or relocation to) the other P-GW.

Meanwhile, in 3GPP release 13, studies are conducted into methods for reselecting (or relocating) a P-GW more suitable for the current location of a UE, while minimizing service disruption, even when the UE is in the connected mode.

In 3GPP release 13, such a method is called Co-ordinated Selected IP traffic Offload (CSIPTO). CSIPTO allows P-GW reselection (or relocation) through coordination between an MME and a UE.

Figure 9:
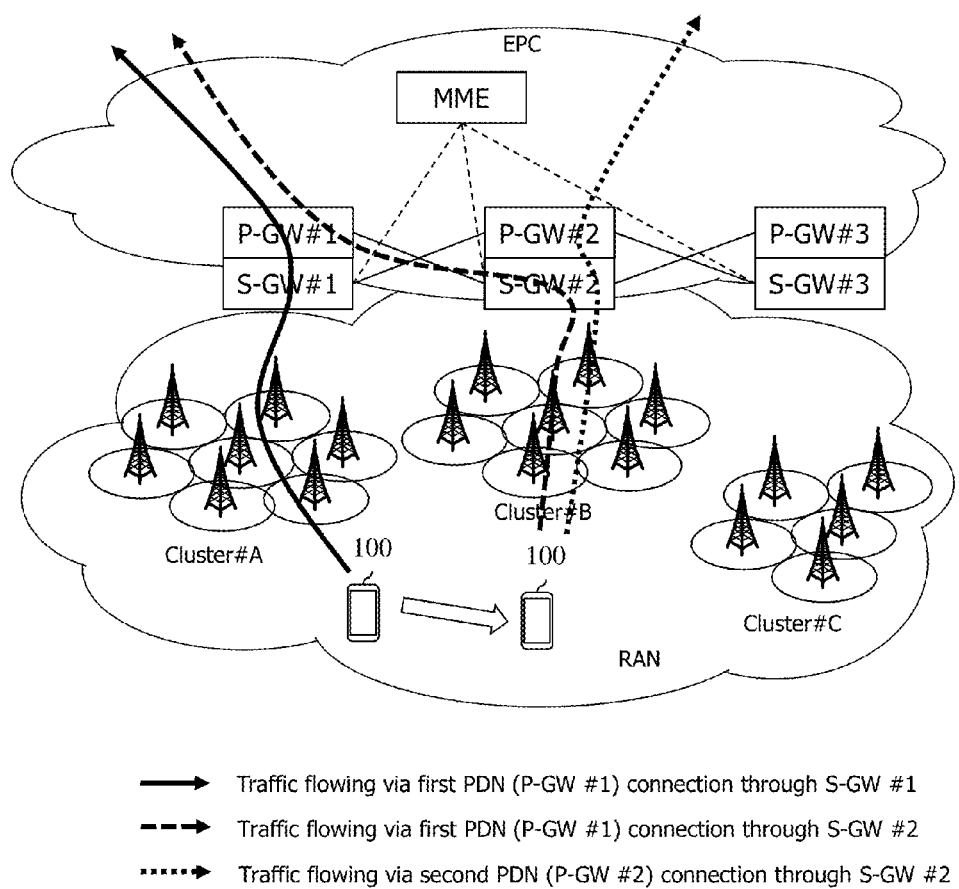
FIG. 9 illustrates a scenario of Co-ordinated Selected IP traffic Offload (CSIPTO) discussed in 3GPP release 13.

FIG. 9 illustrates a scenario of CSIPTO discussed in 3GPP release 13.

Referring to FIG. 9, when a UE 100 located in cluster #A requests a PDN connection to a specific Access Point Name (APN), an MME establishes a first PDN connection via P-GW #1, which is geographically closest to the current location of the UE, in order to optimize backhaul transmission on an EPC network.

Subsequently, the user of the UE 100 performs, using the first PDN connection, a long-lived service for which service continuity is essential, for example, a conference call.

Next, the UE 100 moves from cluster #A to cluster #B. The MME change the first PDN connection for the long-lived service of the UE 100 to be tunnelled through S-GW #2. Here, since the continuity of the first PDN connection for the long-lived service of the UE 100 is essential and the IP address of the UE 100 needs to be preserved, the MME maintains the PDN connection to P-GW #1 instead of reselecting (or relocating) P-GW #2 that is closest to the current location of the UE.

Meanwhile, when the UE 100 requests a new second PDN connection for a different short-lived service while maintaining the first PDN connection for the long-lived service via S-GW #2 and P-GW #1, the MME allows the second PDN connection to be tunnelled through P-GW #2. Here, when the UE 100 requests a new long-lived service, the MME does not generate a new second PDN connection but allows the UE to the first PDN connection via P-GW #1. The reason for not establishing a second PDN connection via P-GW #2 for a new long-lived service is to prevent multiple PDN connections based on the mobility of the UE from being distributed to different P-GWs.

Once the new second PDN connection via P-GW #2 is established, short-lived services other than the long-lived service are transmitted and received through the new second PDN connection via P-GW #2.

The first PDN connection via P-GW #1 is released only when the long-lived service is ended or it is impossible to maintain the first PDN connection.

Meanwhile, in FIG. 9, when the UE 100 moves from cluster #A to cluster #B, a path changed by the movement, that is, the first PDN connection via S-GW #2 and P-GW #1, may be called a sub-optimal PDN connection, and the newly established second PDN connection via S-GW #2 and P-GW #2 may be called an optimal PDN connection.

The definitions of optimal and sub-optional may be based on various criteria, such as geography, topology, and load balancing.

However, 3GPP release 13 discloses only an illustrative scenario of CSIPTO without specific methods for realizing CSIPTO. Further, in a case where a second PDN connection via a second P-GW (P-GW #2) is established due to the movement of the UE, with a first PDN connection via a first P-GW (P-GW #1) being maintained, but the UE moves again so that the first P-GW (P-GW #1) for the first PDN connection becomes more suitable for the current location of the UE, no method for processing the first PDN connection and the second PDN connection has been disclosed so far in 3GPP release 13.

EMBODIMENTS OF THE PRESENT SPECIFICATION

Accordingly, embodiments of the present specification are intended to propose an efficient CSIPTO mechanism. More specifically, embodiments of the present specification propose a mechanism for efficiently providing CSIPTO in a mobile communication system, such as the 3GPP EPS.

In the present specification, a sub-optimal PDN connection may be referred to as an old PDN connection, an existing PDN connection, a first PDN connection, an initial PDN connection, or an original PDN connection, and these terms may be construed as having the same meaning. Further, an optimal PDN connection may be referred to as a new PDN connection, a newly established PDN connection, or a second PDN connection, and these terms may be construed as having the same meaning.

In the present specification, the terms such as traffic, service, IP service, service flow, IP flow, packet, IP packet, data, and application are interchangeable with each other. Also, the term "long-lived service" is interchangeable with the term "service requiring IP address preservation" or "service requiring service continuity" and the term "short-lived service" is interchangeable with the term "service not requiring IP address preservation" or "service not requiring service continuity." For reference, a short-lived service may be, for example, texting, web browsing, etc., and a long-lived service may be, for example, conference call, video call, large file transfer, etc.

A CSIPTO mechanism proposed in the present specification may include a combination of one or more operations below.

I. MME Instructs/Requests UE to Establish Second PDN Connection (that is, Optimal PDN Connection An MME may instruct or request a UE to establish a second PDN connection (that is, an optimal PDN connection) i) while the UE is performing an X2-based handover, ii) after the UE finishes/completes the X2-based handover, iii) while the UE is performing an S1-based handover, iv) after the UE finishes/completes the S2-based handover, or v) the UE, which is in the connected mode, determines to reselect or relocate a P-GW used/routed for a PDN connection of the UE (for example, for load balancing of a P-GW).

The X2-based handover includes both an S-GW reselection (relocation) case and an S-GW non-reselection (non-relocation) case, and the S1-based handover also includes both an S-GW reselection (relocation) case and an S-GW non-reselection (non-relocation) case.

Determining the establishment of the second PDN connection (that is, the optimal PDN connection) is to provide the UE with a service through a P-GW more suitable for (closer to) the current location of the UE according to the mobility of the UE. This determination may be made since a P-GW that is more suitable than a P-GW being connected/used for the existing PDN connection is recognized/determined. Such a determination may be based on current location information on the UE (which is based on the ECGI of the UE, the TAI of the UE and/or the ID of an eNodeB serving the UE, and/or the ID/address/location information on an S-GW serving the UE) and may also be based on various kinds of information (for example, subscriber information (for example, whether CSIPTO is available to or allowed for a subscriber, whether CSIPTO is available to or allowed for an APN associated with the existing PDN, or whether CSIPTO is available to or allowed for an APN associated with the second PDN connection (that is, the optimal PDN connection) to be newly established), mobility information on the UE, operator policies, local configuration information on the MME, load/overload/congestion information on P-GWs (P-GWs including a P-GW which the existing PDN connection is connected to/passes though), and the identifiers/IDs/addresses/location information on P-GWs (P-GWs including the P-GW which the existing PDN connection is connected to/passes though) in addition to the current location information on the UE. The MME may have the aforementioned pieces of information or may acquire the aforementioned pieces of information from another network node, for example, an eNodeB, an S-GW, a P-GW, and an MME previously serving the UE.

When the MME instructs/requests the UE to establish the second PDN connection (that is, the optimal PDN connection) after the UE finishes/completes the handover as described above in ii) and iv), the MME may give/make the above instruction/request to the UE after a certain period of time since the handover procedure is finished. This is because when the P-GW that the UE has determined to be optimal is no longer an optimal P-GW and the original P-GW becomes an optimal P-GW again due to the re-movement of the UE, it is not necessary to establish a new PDN connection.

To instruct/request the UE to establish the second PDN connection (that is, the optimal PDN connection), a conventional NAS message may be used or a new NAS message may be defined for use. When the conventional NAS message is used, a new information element (IE) may be defined for used or an existing IE with a newly defined value/type may be used in an extended manner.

When the MME instructs/requests the UE to establish the second PDN connection (that is, the optimal PDN connection) while the UE is performing the handover as described above in i) and iii), the MME may transmit a separate NAS message to the UE for the above purpose or may, on the other hand, include information on the above instruction/request in a TAU Accept message transmitted to the UE in a TAU procedure that occurs during the handover. To this end, the MME may generate an appropriate TAI list to be provided to the UE in the TAU procedure so that the UE may always perform the TAU procedure when performing the X2-based handover and/or S1-based handover.

When the MME instructs/requests the UE to establish the second PDN connection (that is, the optimal PDN connection), one or more of the following pieces of information may be explicitly or implicitly included. For example, when the information is implicitly included, a message transmitted to the UE itself may be the instruction/request. Further, the following pieces of information may be provided in combinations.

- Information on an APN that the second PDN connection (that is, the optimal PDN connection) is established with.
- SIPTO or CSIPTO indicator.
- Instruction/request that the establishment of the second PDN connection (that is, the optimal PDN connection) is needed.
- Information on waiting time to start establishing the second PDN connection (that is, the optimal PDN connection) (that is, a time value indicating when to start establishing the second PDN connection (that is, the optimal PDN connection) after receiving the instruction/request).
- Instruction/request to use the second PDN connection (that is, the optimal PDN connection) for routing a service not requiring IP address preservation (non-change).
- Information on an APN of the existing PDN connection (a PDN connection that becomes the first PDN connection (that is, the sub-optimal PDN connection)), which may be provided only when the APN has a different value from that of an APN with which the second PDN connection (that is, the optimal PDN connection) is established.
- Instruction/request to deactivate/release the first PDN connection (that is, the sub-optimal PDN connection as the existing PDN connection corresponding to the APN) if the first PDN connection is no longer needed, where if the APN of the existing PDN connection (that becomes the first PDN connection (that is, the sub-optimal PDN connection)) is provided, the APN refers to the APN of the existing PDN connection; otherwise, the APN refers to an APN with which the second PDN connection (that is, the optimal PDN connection) is established. The same is applied to the following two items.
- Instruction/request to maintain the first PDN connection (that is, the sub-optimal PDN connection, which is the existing PDN connection corresponding to the APN) if the first PDN connection is needed.
- Instruction/request to deactivate/release the first PDN connection (that is, the sub-optimal PDN connection, which is the existing PDN connection corresponding to the APN) if a service using the first PDN connection (that is, the sub-optimal PDN connection, a service requiring IP address preservation (non-change)) is absent/finished.

For reference, in the present specification, to establish the second PDN connection (that is, the optimal PDN connection), the MME allows the establishment of the second PDN connection (that is, the optimal PDN connection) to the APN for the existing PDN connection, instead of providing a new APN. Alternatively, when the MME instructs/requests the UE to establish the second PDN connection (that is, the optimal PDN connection), the MME may provide a new APN for the second PDN connection (that is, the optimal PDN connection). For example, when the APN for the existing PDN connection is internet.lte.operator.com, the MME may provide the UE with internet_optimal.lte.operator.com as an APN value for the second PDN connection (that is, the optimal PDN connection). Alternatively, when instructing/requesting the UE to establish the second PDN connection (that is, the optimal PDN connection), the MME may provide the UE with an APN value that replaces the APN corresponding to the existing PDN connection, which becomes the first PDN connection (that is, the sub-optimal connection). For example, when the APN value for the existing PDN connection is internet.lte.operator.com, the MME may provide the UE with an APN value of internet.lte.operator.com for the newly established second PDN connection (that is, the optimal PDN connection) and with an APN value of internet_suboptimal.lte.operator.com for the existing PDN connection that becomes the first PDN connection (that is, the sub-optimal PDN connection). Accordingly, the UE may change the APN value into the changed value and may store the changed value in the context of the existing PDN connection.

It has been described that when the UE moves with only one PDN connection for a specific service type or to a specific APN or specific PDN, the MME determines a P-GW more suitable than a P-GW through which the PDN connection passes and instructs/requests the UE to establish the second PDN connection (that is, the optimal PDN connection) accordingly. For example, in FIG. 9, as the UE 100, which has a PDN connection via S-GW #1 and P-GW #1 in cluster #A, moves to cluster #B, the S-GW of the PDN connection is reselected (relocated) from S-GW #1 to S-GW #2 by a handover procedure and the MME may determine that P-GW #2 is more suitable than P-GW #1 and thus may instruct/request the UE to establish the second PDN connection (that is, the optimal PDN connection).

II. Operation of UE Upon Receiving Instruction/Request to Establish Second PDN Connection (Optimal PDN Connection) from MME When the UE receives an instruction/request to establish the second PDN connection from the MME, the UE performs one or more operations listed below. The order in which the following operations are listed does not refer to the order in which the operations are performed, and the order in which the operations are performed may be properly determined. Here, the following operations may be performed in parallel or sequentially.

1) The UE initiates a PDN connection establishment procedure using an APN (that is, an APN with which the second PDN connection is to be established). This procedure may be based on clause 5.10.2. UE requested PDN connectivity of 3GPP TS 23.401, and the existing procedure may be used as it is or may be modified/extended for the present invention. In an example of modification/extension, the MME may provide a Traffic Flow Template (TFT) for a default bearer via a PDN Connectivity Accept message (encapsulated in an Activate Default EPS Bearer Context Request message) as an NAS message transmitted to the UE in operation 7 illustrated in clause 5.10.2. UE requested PDN connectivity. The TFT is information about a service flow not requiring IP address preservation (non-change) and is to instruct the UE to use the newly established second PDN connection (that is, the optimal PDN connection) for the service. The TFT may be generated based on information that the MME has or may be provided from another network node (for example, a P-GW). To be provided with the TTF from the P-GW, the MME may provide the P-GW with information indicating that the PDN is for the second PDN connection (that is, the optimal PDN connection, or information indicating that the PDN connection is established according to SIPTO/CSIPTO) during the PDN connection establishment procedure.

When the UE receives the information on the waiting time to start establishing the second PDN connection (that is, the optimal PDN connection) from the MME as described above in section I, the UE initiates the PDN connection establishment procedure after provided waiting time. Further, when no time information is provided but the UE has configuration information thereof, the UE may initiate the PDN connection establishment procedure after waiting for a certain period time based on the configuration information.

When the second PDN connection (that is, the optimal PDN connection) is established, the UE may additionally mark the second PDN connection (that is, the optimal PDN connection) with one or more pieces of information listed below. Marking the PDN connection may mean storing or configuring/setting the following pieces of information in a database/context associated with the PDN connection stored/managed by the MME. Further, marking the PDN connection may mean that the UE manages/traces/recognizes the information. Such interpretations of marking are applied through the present invention.

- Information indicating that the PDN connection is optimal
- Information indicating that the PDN connection is related to SIPTO/CSIPTO
- Information on the first PDN connection (that is, the sub-optimal PDN connection) corresponding to the PDN connection (for example, the APN of the first PDN connection (that is, the sub-optimal PDN connection), the default bearer ID of the first PDN connection (that is, the sub-optimal PDN connection), and the like)

2) The UE checks whether there is a service (for example, a service requiring IP address preservation) using the first PDN connection (that is, the sub-optimal PDN connection) of the APN (which refers to the APN of the existing PDN connection (that becomes the first PDN connection (that is, the sub-optimal PDN connection)) if the APN of the existing PDN connection is provided, and refers to an APN with which the second PDN connection (that is, the optimal PDN connection) is established otherwise).

When a service (for example, a service requiring IP address preservation) using the first PDN connection (that is, the sub-optimal PDN connection) is absent, the UE initiates a procedure for deactivating/releasing the first PDN connection (that is, the sub-optimal PDN connection). This procedure may be based on clause 5.10.3. UE or MME requested PDN disconnection of TS 23.401, and the existing procedure may be used as it is or may be modified/extended for the present invention. In an example of modification/extension, the UE may include information indicating that this procedure is to deactivate/release the first PDN connection (that is, the sub-optimal PDN connection) in a PDN Disconnection Request message as an NAS message transmitted to the MME in operation 1 described in clause 5.10.3. UE or MME requested PDN disconnection.

When the MME provides a new APN for the second PDN connection (that is, the optimal PDN connection) when instructing/requesting the UE to establish the second PDN connection (that is, the optimal PDN connection) as described above in section I, the UE may selectively deactivate/release the first PDN connection (that is, the sub-optimal PDN connection) and may modify the APN value of the second PDN connection (that is, the optimal PDN connection) to correspond to the APN value of the first PDN connection (that is, the sub-optimal PDN connection). For example, when the APN of the existing PDN connection is internet.lte.operator.com and an APN value of internet_optimal.lte.operator.com is provided for the second PDN connection (that is, the optimal PDN connection), the UE may deactivate/release the first PDN connection (that is, the sub-optimal PDN connection) and may modify the APN value of the second PDN connection (that is, the optimal PDN connection) into internet.lte.operator.com. In addition, the UE may notify the MME of this modification in the procedure for deactivating/releasing the first PDN connection (that is, the sub-optimal PDN connection).

Meanwhile, when there is a service (for example, a service requiring IP address preservation) using the first PDN connection (that is, the sub-optimal PDN connection), the UE maintains the first PDN connection (that is, the sub-optimal PDN connection). Additionally, the UE may mark the first PDN connection (that is, the sub-optimal PDN connection) with one or more pieces of information listed below.

① Information indicating that the PDN connection is sub-optimal

② Information indicating that the deactivation/release of the PDN connection is needed when a service using the PDN connection (that is, a service requiring IP address preservation) is absent/finished ③ Information indicating that that the deactivation/release of the PDN connection is needed when the PDN connection becomes unnecessary ④ Information indicating that the PDN connection needs to be maintained while the PDN connection is necessary ⑤ Information indicating that the PDN connection is related to SIPTO/CSIPTO ⑥ Information on the second PDN connection (that is, the optimal PDN connection) corresponding to the PDN connection (for example, the APN of the second PDN connection (that is, the optimal PDN connection), the default bearer ID of the second PDN connection (that is, the optimal PDN connection), and the like)

3) The UE uses the second PDN connection (that is, the optimal PDN connection) for a service (for example, a service not requiring IP address preservation) using the first PDN connection (that is, the sub-optimal PDN connection) of the APN (which refers to the APN of the existing PDN connection described in section I (that becomes the first PDN connection (that is, the sub-optimal PDN connection)) if the APN of the existing PDN connection is provided, and refers to an APN with which the second PDN connection described in section I (that is, the optimal PDN connection) is established otherwise).

The UE may store the context of the newly established second PDN connection (that is, the optimal PDN connection) separately from the context of the first PDN connection (that is, the sub-optimal PDN connection). That is, the following UE context may store the following pieces of information separately on the first PDN connection (that is, the sub-optimal PDN connection) and the second PDN connection (that is, the optimal PDN connection).

TABLE 2

| Field | Description |
| --- | --- |
| IMSI | Abbreviation for International Mobile Subscriber Identity, which is the subscribers permanent identity |
| EMM State | Abbreviation for Mobility Management State, which are classified into EMM-REGISTERED and EMM-DEREGISTERED |
| GUTI | Globally Unique Temporary Identity |
| ME Identity | Mobile Equipment Identity - (e.g. IMEI/IMEISV) Software Version Number |
| Tracking Area List | Current Tracking Area list |
| last visited TAI | TAI which is contained in the TA list in a UE-registered network and which identifies the tracking area last visited by the UE |
| Selected NAS Algorithm | Selected NAS security algorithm |
| Selected AS Algorithm | Selected AS security algorithms |
| Temporary Identity used in Next update (TIN) | Internally used by the UE to store a temporary ID to be used in an Attach Request message and RAU/TAU Request message |
| UE Specific DRX Parameters | Preferred E-UTRAN DRX cycle length |
| For each active PDN connection | |
| APN in Use | APN currently used. This APN includes the APN Network Identifier and the default APN Operator Identifier |
| APN-AMBR | Mmaximally aggregated uplink and downlink MBR to be shared across all Non-GBR bearers, which are established for this APN |
| Assigned PDN Type | PDN Type assigned by the network (IPv4, IPv6, or IPv4v6) |
| IP Address(es) | IPv4 address and/or IPv6 prefix |
| Default Bearer | Identifies the default bearer within the PDN connection by EPS Bearer ID |
| For each EPS Bearer within the PDN connection | |
| EPS Bearer ID | An EPS bearer identity identifies an EPS bearer for one UE accessing via E-UTRAN |
| TI | Transaction Identifier |
| EPS bearer QoS | GBR and MBR for GBR bearer. |
| TFT | Traffic Flow Template. |

As described above in 2), when the UE marks the first PDN connection (that is, the sub-optimal PDN connection) with information indicating that this PDN connection is sub-optimal, the following information may be added to the context of the PDN connection, for example.

TABLE 3

| Suboptimal due to CSIPTO | Indicates that this PDN connection is suboptimal due to CSIPTO |
| --- | --- |

III. Operation of MME in Case where MME Determines that First PDN Connection (Sub-Optimal PDN Connection) Becomes Optimal Again in Coexistence of First PDN Connection (Sub-Optimal PDN Connection) and Second PDN Connection (Optimal PDN Connection)

The MME may determine that the first PDN connection (sub-optimal PDN connection) becomes optimal again in cases i) to v) described above in section I, and such a determination may be based on the current location information on the UE and various kinds of information as mentioned above in section I. The first PDN connection (that is, the sub-optimal PDN connection) becoming the optimal PDN connection again means that the first P-GW that the first PDN connection passes through is determined/recognized as a more suitable P-GW than the second P-GW that the second PDN connection passes through based on the current location information on the UE and various kinds of information.

The MME may also store the context of the newly established second PDN connection (that is, the optimal PDN connection) separately from the context of the first PDN connection (that is, the sub-optimal PDN connection) as the UE does, described above in section II. Further, as described above in section II, various pieces of information associated with CSIPTO may be marked/stored in the database/context stored/managed for the second PDN connection (that is, the optimal PDN connection) and/or the first PDN connection (that is, the sub-optimal PDN connection). Accordingly, the MME may recognize that the first PDN connection (that is, the sub-optimal PDN connection) and the second PDN connection (that is, the optimal PDN connection) coexist for the UE.

When the MME determines that the first PDN connection (that is, the sub-optimal PDN connection) becomes an optimal PDN connection again, the MME initiates a procedure for deactivating/releasing the current second PDN connection (that is, the previous optimal PDN connection). For example, when the MME determines that PDN connection #1 becomes optimal again in the situation where PDN connection #1 is a sub-optimal PDN connection and PDN connection #2 is an optimal PDN connection, the MME initiates a procedure for deactivating/releasing PDN connection #2. This procedure may be based on clause 5.10.3. UE or MME requested PDN disconnection of 3GPP TS 23.401, and the existing procedure may be used as it is or may be modified/extended for the present invention. In an example of modification/extension, the MME may include information indicating that this procedure is to deactivate/release the previous PDN connection and/or information indicating that the sub-optimal PDN connection becomes an optimal PDN connection in a Deactivate EPS Bearer Context Request message as an NAS message transmitted to the UE in operation 7 described in clause 5.10.3. UE or MME requested PDN disconnection.

The MME may initiate the procedure for deactivating/releasing the previous optimal PDN connection immediately after determining that the sub-optimal PDN connection becomes the optimal PDN connection or the MME may initiate the procedure for deactivating/releasing the previous optimal PDN connection that is current present after a certain period of time.

The above description is applied to the scenario illustrated in FIG. 9 as follows. When the UE 100, which currently has the second PDN connection via S-GW#2 and P-GW#2 (that is, the optimal PDN connection) and the first PDN connection via S-GW#2 and P-GW#1 (that is, the sub-optimal PDN connection), moves back to cluster #A, the MME determines that P-GW#1 is more suitable than P-GW#2 and thus deactivates/release the second PDN connection.

IV. Operation of UE Upon Receiving Request/Instruction to Deactivate/Release Second PDN connection (optimal PDN connection) from MME When the UE receives a request/instruction to deactivate/release the second PDN connection, the UE performs one or more operations listed below. The order in which the following operations are listed does not refer to the order in which the operations are performed, and the order in which the operations are performed may be properly determined. Here, the following operations may be performed in parallel or sequentially.

1) The UE determines/decides that the first PDN connection (that is, the sub-optimal PDN connection) corresponding to the second PDN connection (that is, the optimal PDN connection) that the UE is requested/instructed to delete becomes an optimal PDN connection (or becomes a PDN connection unrelated to SIPTO/CSIPTO or a normal PDN connection). Alternatively, the UE determines/decides that the first PDN connection (that is, the sub-optimal PDN connection) corresponding to the second PDN connection (that is, the optimal PDN connection) that the UE is requested/instructed to delete needs to be maintained (may not need to be deleted). In addition, when the UE marks/ stores information ① to ⑥ described above in 2) of section II with respect to the first PDN connection (that is, the sub-optimal PDN connection), the UE deletes/resets the marking.

2) The UE deletes the PDN connection that the MME requests/instructs the UE to deactivate/release. That is, the UE releases all resources for this PDN connection.

3) The UE uses the first PDN connection, which has turned optimal, for a service using the second PDN connection that the MME requests/instructs the UE to deactivate/release.

Meanwhile, when traffic using the first PDN connection, which has changed from a sub-optimal PDN connection to an optimal PDN connection (a PDN connection unrelated to SIPTO/CSIPTO or normal PDN connection), is completed or does no longer exist, the UE may maintain the second PDN connection, instead of deleting the second PDN connection.

V. MME Instructs/Requests UE to Re-Establish (or Reactivate) Optimal PDN Connection Referring to the scenario illustrated in FIG. 9, when the UE 100, which currently has the second PDN connection via S-GW#2 and P-GW#2 (that is, the optimal PDN connection) and the first PDN connection via S-GW#2 and P-GW#1 (that is, the sub-optimal PDN connection), moves back to cluster #C, the MME may determines that P-GW#3 is more suitable than P-GW#2 and thus initiates the re-establishment of an optimal PDN connection.

The MME may determine the re-establishment of an optimal PDN connection in cases i) to v) described above in section I, and such a determination may be based on the current location information on the UE and various kinds of information as mentioned above in section I. This means that another P-GW is determined/recognized as a more suitable P-GW than the currently connected/used P-GW based on the current location information on the UE and various kinds of information. Accordingly, the MME determines/recognizes that it is necessary to re-establish an optimal PDN connection.

When the MME determined to re-establish an optimal PDN connection, the MME initiates a procedure for re-establishing an optimal PDN connection. That is, the MME initiates a procedure for instructing/requesting the UE to re-establish (or reactivate) an optimal PDN connection. This procedure may be based on clause 5.10.3. UE or MME requested PDN disconnection of 3GPP TS 23.401, and the existing procedure may be used as it is or may be modified/extended for the present invention. Alternatively, a new procedure/message may be defined. For example, the MME includes a cause value indicating "Reactivation requested" in an IE of ESM cause when transmitting a Deactivate EPS Bearer Context Request message as an NAS message transmitted to the UE in operation described in clause 5.10.3. UE or MME requested PDN disconnection.

Alternatively/additionally, the MME may define a new IE or may define a new value in the ESM cause, thus including information indicating that this procedure is to re-establish an optimal PDN connection. When receiving the request/instruction from the MME, the UE deactivates/release the optimal PDN connection and re-establishes or reactivates an optimal PDN connection. The procedure for re-establishing the optimal PDN connection may be based on clause 5.10.2. UE requested PDN connectivity of 3GPP TS 23.401, and the existing procedure may be used as it is or may be modified/extended for the present invention.

The MME may initiate the procedure immediately after determining that it is necessary to re-establish an optimal PDN connection or after a certain period of time.

It has been described that when the MME instructs/requests the UE to establish an optimal PDN connection, the UE initiates a procedure for establishing a PDN connection. Alternatively, it is possible that the MME may autonomously initiate a procedure for establishing a PDN connection.

Although it has been described above that the MME stores/marks various pieces of information related to SIPTO/CSIPTO in a database/context by PDN connection, these pieces of information may be stored/marked by bearer. Alternatively, some information may be stored/marked by PDN connection, while some information may be store/marked by bearer. For example, instead of storing/marking information indicating that the first PDN connection is sub-optimal, information indicating that each bearer belonging to this PDN connection is sub-optimal may be stored/marked.

Figure 10:
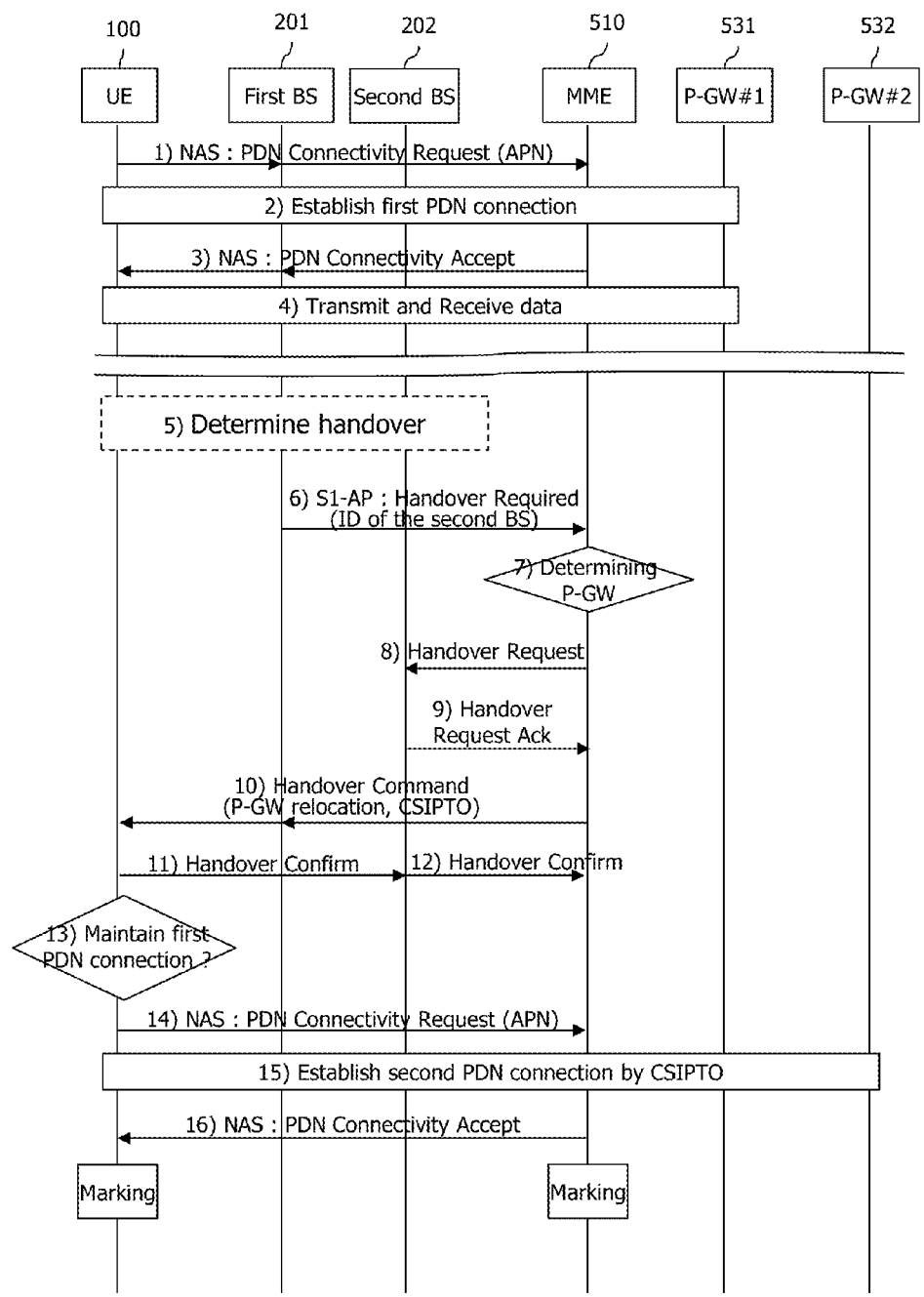
FIG. 10 is a signal flowchart illustrating an operation according to some embodiments of the present specification in the scenario illustrated in FIG. 9.

FIG. 10 is a signal flowchart illustrating an operation according to some embodiments of the present specification in the scenario illustrated in FIG. 9.

A handover procedure illustrated in FIG. 10 is, for example, an S1-based handover procedure.

1) The UE 100, which is located in cluster #A illustrated in FIG. 9, transmits a PDN Connectivity Request message to the MME 510 through a first BS 201.

2-3) When a first PDN connection is established, the MME 510 transmits a PDN Connectivity Accept message to the UE.

4) The UE 100 transmits and receives data on a long-lived service requiring IP address preservation through the first PDN connection.

5) Subsequently, when the UE 100 moves from cluster #A to cluster #B in FIG. 9, a handover is determined.

6) The first BS 201 transmits a Handover Required message including the ID of a second BS to the MME 510.

7) When the MME 510 determines to perform CSIPTO through the second BS 202, the MME 510 determines a P-GW suitable for the UE 100, for example, P-GW#2 532 which is close to the second BS 202.

8) The MME 510 transmits a Handover Request message to the second BS 202.

9) The second BS 202 transmits a Handover Request Acknowledgement (Ack) message to the MME 510.

10) The MME 510 transmits a Handover Command message to the UE 100 through the first BS 201. The Handover Command message may include an indication indicating P-GW reselection (or relocation) or an indication indicating that it is necessary to establish a second PDN connection, that is, an optimal PDN connection, due to CSIPTO.

11-12) The UE 100 transmits a Handover Confirm message to the MME 510 through the second BS 202.

13) The UE 100 determines whether to maintain the first PDN connection, that is, the sub-optimal PDN connection. When the UE determines to maintain the first PDN connection (sub-optimal PDN connection), the UE 100 does not perform a procedure for deactivating/releasing the first PDN connection.

14) Next, the UE 100 transmits a PDN Connectivity Request message to the MME 510 to establish the second PDN connection (that is, the optimal PDN connection).

15-16) The second PDN connection to P-GW#2 532 is established due to CSIPTO, and the MME 510 transmits a PDN Connectivity Accept message to the UE 100.

Meanwhile, the UE 100 and the MME 510 mark the first PDN connection as a sub-optimal PDN connection and mark the second PDN connection as an optimal PDN connection. Although FIG. 10 illustrates the marking operation after operation 16 for convenience, the marking operation may be performed immediately after determining whether each PDN connection is sub-optimal or optimal.

In the procedure illustrated in FIG. 10, the MME and/or S-GW may be changed via reselection or may not be changed due to the handover of the UE.

Meanwhile, the UE 100 may include a CSIPTO function unit (or IP packet filter function unit).

An operation of the CSIPTO function unit (or IP packet filter function unit) is described in detail as follows.

1) The CSIPTO function unit of the UE may determine which to use for an IP flow newly occurring among the second PDN connection (that is, the optimal PDN connection) and the first PDN connection (that is, the sub-optimal PDN connection).

When the UE currently has both the second PDN connection (that is, the optimal PDN connection) and the first PDN connection (that is, the sub-optimal PDN connection) corresponding (related) thereto and an IP flow occurs corresponding to an APN related to the PDN connections (the two PDN connections may use the same APN or different APNs), the CSIPTO function unit of the UE determines whether the IP flow has a characteristic of an IP flow requiring IP address preservation (non-change). When the IP flow requires IP address preservation, the CSIPTO function unit of the UE determines to use the first PDN connection (that is, the sub-optimal PDN connection) for the IP flow. When the IP flow does not require IP address preservation, the CSIPTO function unit of the UE determines to use the second PDN connection (that is, the optimal PDN connection) for the IP flow.

To identify the characteristic of the IP flow, the CSIPTO function unit may use various pieces of information on the IP flow (for example, application type/ID, service type, destination IP address, departure port number, destination port number, protocol type, QoS information, destination domain name, and the like).

When a PDN connection to use is determined, the CSIPTO function unit may directly set up/change the destination IP address of an IP header using an IP address corresponding to the PDN or may notify an IP stack in the UE of the PDN connection to set up/change the destination IP address of the IP header using an IP address corresponding to the IP stack.

2) The CSIPTO function unit of the UE may determine whether to remove the first PDN connection (that is, the sub-optimal PDN connection).

When the UE currently has both the second PDN connection (that is, the optimal PDN connection) and the first PDN connection (that is, the sub-optimal PDN connection) corresponding (related) thereto and recognizes that the first PDN connection (that is, the sub-optimal PDN connection) is not used for a certain period of time, the CSIPTO function unit of the UE notifies an NAS layer of this information so that the NAS layer removes the PDN. Here, the CSIPTO function unit of the UE may provide information on the PDN connection that the NAS layer needs to remove (for example, an APN, a PDN ID, an IP address corresponding to the PDN connection, and the like). When the information is received, the NAS layer initiates a procedure for deactivating/releasing the first PDN connection (that is, the sub-optimal PDN connection) according to the method described in 2) of II.

Although the foregoing description has been made focusing on the E-UTRAN, the present invention may also be applied when an access network is the UTRAN or GERAN. In this case, an SGSN may be considered to serve as an MME.

The aforementioned details may be implemented in hardware, which is described with reference to FIG. 11.

FIG. 11 is a block diagram illustrating a configuration of the UE 100 and the MME 510 according to one embodiment of the present invention.

As illustrated in FIG. 11, the UE 100 includes a storage means 101, a controller/processor 102, and a transceiver 103. The MME 510 includes a storage means 511, a controller/processor 512, and a transceiver 513.

The storage means 101 and 511 store the foregoing methods.

The controllers 102 and 512 control the storage means 101 and 511 and the transceivers 103 and 513. Specifically, the controllers 102 and 512 perform the foregoing methods stored in the storage means 101 and 511. The controllers 102 and 512 transmit the foregoing signals through the transceivers 103 and 513.

Although exemplary embodiments of the present invention have been illustrated above, the scope of the present invention is not limited by these specific embodiments. Therefore, the present invention may be changed, modified, or adapted variously without departing from the idea of the present invention and the appended claims.

What is claimed is:

1. A method for establishing a plurality of Packet Data Network (PDN) connections due to Co-ordinated Selected IP Traffic Offload (CSIPTO), the method performed by a user equipment (UE) and comprising:

receiving, by the UE, from a network entity responsible for a control plane, an indication of reallocation of a gateway due to the CSIPTO;

determining, by the UE, whether to maintain or release a previously established first PDN connection based on the indication;

establishing, by the UE, a second PDN connection based on the indication;

marking, by the UE, the first PDN connection as a sub-optimal PDN connection into a first context for the first PDN connection, when the previously established first PDN connection is maintained;

marking, by the UE, the second PDN connection as an optimal PDN connection into a second context for the second PDN connection, wherein the first context includes all of:

first information indicating that the first PDN connection is the sub-optimal PDN connection, second information indicating whether to deactivate or release the first PDN connection when a service using the first PDN connection is finished, third information indicating whether to deactivate or release the first PDN connection when the first PDN connection becomes unnecessary, fourth information indicating that the first PDN connection is related to a CSIPTO, and
fifth information including an access point name (APN) and a default bearer ID of the second PDN connection;
receiving, by the UE, a request message for releasing the second PDN connection from the network entity;
releasing, by the UE, the second PDN connection, which has been marked as the optimal PDN connection, in response to the received request message; and
deleting, by the UE, the marking of the first PDN connection as the sub-optimal PDN connection.

2. The method of claim 1, further comprising:
determining whether data associated with a service is to be transmitted to the second PDN connection, based on a type of the service being performed after establishing the second PDN connection.

3. The method of claim 1, further comprising:
not transmitting a request message for deactivating or releasing the first PDN connection to the network entity when it is determined to maintain the previously established first PDN connection.

4. The method of claim 3, wherein when the request message for deactivating or releasing the first PDN connection is not transmitted, the network entity marks the first PDN connection as a sub-optimal PDN connection.

5. The method of claim 1, wherein the indication is received during or after a handover process.

6. The method of claim 1, wherein the network entity is a Mobility Management Entity (MME), and the gateway is a PDN gateway (P-GW).

7. A user equipment (UE) for establishing a plurality of Packet Data Network (PDN) connections due to Co-ordinated Selected IP Traffic Offload (CSIPTO), the UE comprising:
a transceiver that receives, from a network entity responsible for a control plane, an indication of reallocation of a gateway due to the CSIPTO; and
a processor that determines whether to maintain or release a previously established first PDN connection based on the indication and to establish a new second PDN connection based on the indication,
wherein when the previously established first PDN connection is maintained, the processor further:
marks the first PDN connection as a sub-optimal PDN connection into a first context for the first PDN connection, and
marks the second PDN connection as an optimal PDN connection into a second context for the second PDN connection,
wherein the first context includes all of:
first information indicating that the first PDN connection is the sub-optimal PDN connection,
second information indicating whether to deactivate or release the first PDN connection when a service using the first PDN connection is finished,
third information indicating whether to deactivate or release the first PDN connection when the first PDN connection becomes unnecessary,
fourth information indicating that the first PDN connection is related to a CSIPTO, and
fifth information including an access point name (APN) and a default bearer ID of the second PDN connection;
wherein when a request message for releasing the second PDN connection is received from the network entity, the processor further:
releases the second PDN connection, which has been marked as the optimal PDN connection, and
deleting the marking of the first PDN connection as the sub-optimal PDN connection.

8. The UE of claim 7, wherein the processor determines whether data associated with a service is to be transmitted to the second PDN connection, based on a type of the service being performed after establishing the second PDN connection.

9. The UE of claim 7,
wherein the processor does not control the transceiver to transmit a request message for deactivating or releasing the first PDN connection to the network entity when it is determined to maintain the previously established first PDN connection.

10. The UE of claim 9, wherein when the request message for deactivating or releasing the first PDN connection is not transmitted, the network entity marks the first PDN connection as a sub-optimal PDN connection.

11. The UE of claim 7, wherein the indication is received during or after a handover process.

12. The UE of claim 7, wherein the network entity is a Mobility Management Entity (MME), and the gateway is a PDN gateway (P-GW).

* * * * *